(12) United States Patent
Perkins

(10) Patent No.: US 7,630,133 B2
(45) Date of Patent: Dec. 8, 2009

(54) INORGANIC, DIELECTRIC, GRID POLARIZER AND NON-ZERO ORDER DIFFRACTION GRATING

(75) Inventor: Raymond T. Perkins, Orem, UT (US)

(73) Assignee: Moxtek, Inc., Orem, UT (US)

(*) Notice: Subject to any disclaimer, the term of this patent is extended or adjusted under 35 U.S.C. 154(b) by 83 days.

(21) Appl. No.: 11/669,765

(22) Filed: Jan. 31, 2007

(65) Prior Publication Data

US 2007/0165307 A1  Jul. 19, 2007

Related U.S. Application Data

(63) Continuation-in-part of application No. 11/640,112, filed on Dec. 15, 2006, which is a continuation-in-part of application No. 11/005,927, filed on Dec. 6, 2004, now Pat. No. 7,570,424, application No. 11/669,765, which is a continuation-in-part of application No. 11/469,210, filed on Aug. 31, 2006, and a continuation-in-part of application No. 11/469,226, filed on Aug. 31, 2006, and a continuation-in-part of application No. 11/469,241, filed on Aug. 31, 2006, now abandoned, and a continuation-in-part of application No. 11/469,253, filed on Aug. 31, 2006, now abandoned, and a continuation-in-part of application No. 11/469,266, filed on Aug. 31, 2006, now abandoned.

(51) Int. Cl.
G02B 5/30 (2006.01)
G02B 27/28 (2006.01)
G02B 5/18 (2006.01)

(52) U.S. Cl. .............. 359/486; 359/495; 359/500; 359/569; 359/575; 359/576

(58) Field of Classification Search ............ 359/486, 359/495, 497, 500, 569, 572, 488, 566, 575, 359/576, 580
See application file for complete search history.

(56) References Cited

U.S. PATENT DOCUMENTS 2,224,214 A  12/1940 Brown (Continued)

FOREIGN PATENT DOCUMENTS

AU  2003267964  12/2003

(Continued)

OTHER PUBLICATIONS

Zhang et al., "A broad-angle polarization beam splitter based on a simple dielectric periodic structure." Optices Express, Oct. 29, 2007, 6 pages, vol. 15, No. 22.

(Continued)

Primary Examiner—Ricky D Shafer
(74) Attorney, Agent, or Firm—Thorpe North & Western LLP

(57) ABSTRACT

An inorganic, dielectric grid polarizer includes an optical stack with a diffraction grating and an inorganic, dielectric grid polarizer. The inorganic, dielectric grid polarizer includes a stack of film layers with an array of parallel ribs in accordance with $P_{GP}<\lambda/2$ where $P_{GP}$ is the period of the ribs and $\lambda$ is the wavelength of the light. The diffraction grating includes an array of elongated parallel dielectric ribs in accordance with $P_{DG}>\lambda/2$ where $P_{DG}$ is the period of the ribs.

20 Claims, 9 Drawing Sheets

U.S. PATENT DOCUMENTS

| | | |
|---|---|---|
| 2,237,567 A | 4/1941 | Land |
| 2,287,598 A | 6/1942 | Brown |
| 2,391,451 A | 12/1945 | Fischer |
| 2,403,731 A | 7/1946 | MacNeille |
| 2,605,352 A | 7/1952 | Fishcer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,235,630 A | 2/1966 | Doherty et al. |
| 3,291,550 A | 12/1966 | Bird et al. |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A * | 12/1987 | Shurtz et al. ................ 359/352 |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,196,926 A | 3/1993 | Lee |
| 5,196,953 A | 3/1993 | Yeh et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,422,756 A | 6/1995 | Weber |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,600,383 A | 2/1997 | Hornbeck |
| 5,609,939 A | 3/1997 | Petersen et al. |
| 5,612,820 A | 3/1997 | Schrenk et al. |
| 5,619,352 A | 4/1997 | Koch et al. |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |

| | | | | | | |
|---|---|---|---|---|---|---|
| 5,658,060 | A | 8/1997 | Dove | 6,339,454 B1 | 1/2002 | Knox |
| 5,686,979 | A | 11/1997 | Weber et al. | 6,340,230 B1 | 1/2002 | Bryars et al. |
| 5,706,063 | A | 1/1998 | Hong | 6,345,895 B1 | 2/2002 | Maki et al. |
| 5,719,695 | A | 2/1998 | Heimbuch | 6,348,995 B1 | 2/2002 | Hansen et al. |
| 5,731,246 | A | 3/1998 | Bakeman, Jr. et al. | 6,375,330 B1 | 4/2002 | Mihalakis |
| 5,748,368 | A | 5/1998 | Tamada et al. | 6,398,364 B1 | 6/2002 | Bryars |
| 5,748,369 | A | 5/1998 | Yokota | 6,406,151 B1 | 6/2002 | Fujimori |
| 5,751,388 | A | 5/1998 | Larson | 6,409,525 B1 | 6/2002 | Hoelscher et al. |
| 5,751,466 | A | 5/1998 | Dowling et al. | 6,424,436 B1 * | 7/2002 | Yamanaka .................. 359/15 |
| 5,767,827 | A | 6/1998 | Kobayashi et al. | 6,426,837 B1 | 7/2002 | Clark et al. |
| 5,798,819 | A | 8/1998 | Hattori et al. | 6,447,120 B1 | 9/2002 | Hansen et al. |
| 5,808,795 | A | 9/1998 | Shimomura et al. | 6,452,724 B1 | 9/2002 | Hansen et al. |
| 5,826,959 | A | 10/1998 | Atsuchi | 6,460,998 B1 | 10/2002 | Watanabe |
| 5,826,960 | A | 10/1998 | Gotoh et al. | 6,486,997 B1 | 11/2002 | Bruzzone et al. |
| 5,828,489 | A | 10/1998 | Johnson et al. | 6,496,239 B2 | 12/2002 | Seiberle |
| 5,833,360 | A | 11/1998 | Knox et al. | 6,496,287 B2 | 12/2002 | Seiberle et al. |
| 5,838,403 | A | 11/1998 | Jannson et al. | 6,511,183 B2 | 1/2003 | Shimizu et al. |
| 5,841,494 | A | 11/1998 | Hall | 6,520,645 B2 | 2/2003 | Yamamoto et al. |
| 5,844,722 | A | 12/1998 | Stephens et al. | 6,532,111 B2 | 3/2003 | Kurtz et al. |
| 5,886,754 | A | 3/1999 | Kuo | 6,547,396 B1 | 4/2003 | Svardal et al. |
| 5,890,095 | A | 3/1999 | Barbour et al. | 6,580,471 B2 | 6/2003 | Knox |
| 5,898,521 | A | 4/1999 | Okada | 6,583,930 B1 | 6/2003 | Schrenk et al. |
| 5,899,551 | A | 5/1999 | Neijzen et al. | 6,585,378 B2 | 7/2003 | Kurtz et al. |
| 5,900,976 | A | 5/1999 | Handschy et al. | 6,624,936 B2 | 9/2003 | Kotchick et al. |
| 5,907,427 | A | 5/1999 | Scalora et al. | 6,643,077 B2 | 11/2003 | Magarill et al. |
| 5,912,762 | A | 6/1999 | Li et al. | 6,661,475 B1 | 12/2003 | Stahl et al. |
| 5,914,818 | A | 6/1999 | Tejada et al. | 6,661,484 B1 | 12/2003 | Iwai et al. |
| 5,917,562 | A | 6/1999 | Woodgate et al. | 6,665,119 B1 | 12/2003 | Kurtz et al. |
| 5,918,961 | A | 7/1999 | Ueda | 6,666,556 B2 | 12/2003 | Hansen et al. |
| 5,930,050 | A | 7/1999 | Dewald | 6,669,343 B2 | 12/2003 | Shahzad et al. |
| 5,943,171 | A | 8/1999 | Budd et al. | 6,698,891 B2 | 3/2004 | Kato |
| 5,958,345 | A | 9/1999 | Turner et al. | 6,704,469 B1 | 3/2004 | Xie et al. |
| 5,965,247 | A | 10/1999 | Jonza et al. | 6,710,921 B2 | 3/2004 | Hansen et al. |
| 5,969,861 | A | 10/1999 | Ueda et al. | 6,714,350 B2 | 3/2004 | Silverstein et al. |
| 5,973,833 | A | 10/1999 | Booth et al. | 6,721,096 B2 | 4/2004 | Bruzzone et al. |
| 5,978,056 | A | 11/1999 | Shintani et al. | 6,764,181 B2 | 7/2004 | Magarill et al. |
| 5,982,541 | A | 11/1999 | Li et al. | 6,769,779 B1 | 8/2004 | Ehrne et al. |
| 5,986,730 | A | 11/1999 | Hansen et al. | 6,781,640 B1 | 8/2004 | Huang |
| 5,991,075 | A | 11/1999 | Katsuragawa et al. | 6,785,050 B2 | 8/2004 | Lines et al. |
| 5,991,077 | A | 11/1999 | Carlson et al. | 6,788,461 B2 | 9/2004 | Kurtz et al. |
| 6,005,918 | A | 12/1999 | Harris et al. | 6,805,445 B2 | 10/2004 | Silverstein et al. |
| 6,008,951 | A | 12/1999 | Anderson | 6,809,864 B2 | 10/2004 | Martynov et al. |
| 6,010,121 | A | 1/2000 | Lee | 6,811,274 B2 | 11/2004 | Olczak |
| 6,016,173 | A | 1/2000 | Crandall | 6,813,077 B2 | 11/2004 | Borrelli et al. |
| 6,018,841 | A | 2/2000 | Kelsay et al. | 6,816,290 B2 | 11/2004 | Mukawa |
| 6,053,616 | A | 4/2000 | Fujimori et al. | 6,821,135 B1 | 11/2004 | Martin |
| 6,055,103 | A | 4/2000 | Woodgate et al. | 6,823,093 B2 | 11/2004 | Chang et al. |
| 6,056,407 | A | 5/2000 | Iinuma et al. | 6,829,090 B2 | 12/2004 | Katsumata et al. |
| 6,062,694 | A | 5/2000 | Oikawa et al. | 6,844,971 B2 | 1/2005 | Silverstein et al. |
| 6,075,235 | A | 6/2000 | Chun | 6,846,089 B2 | 1/2005 | Stevenson et al. |
| 6,081,312 | A | 6/2000 | Aminaka et al. | 6,859,303 B2 | 2/2005 | Wang et al. |
| 6,081,376 | A | 6/2000 | Hansen et al. | 6,876,784 B2 | 4/2005 | Nikolov et al. |
| 6,082,861 | A | 7/2000 | Dove et al. | 6,896,371 B2 | 5/2005 | Shimizu et al. |
| 6,089,717 | A | 7/2000 | Iwai | 6,897,926 B2 | 5/2005 | Mi et al. |
| 6,096,155 | A | 8/2000 | Harden et al. | 6,899,440 B2 | 5/2005 | Bierhuizen |
| 6,096,375 | A | 8/2000 | Ouderkirk et al. | 6,900,866 B2 | 5/2005 | Kurtz et al. |
| 6,108,131 | A | 8/2000 | Hansen et al. | 6,909,473 B2 | 6/2005 | Mi et al. |
| 6,122,103 | A | 9/2000 | Perkins et al. | 6,920,272 B2 | 7/2005 | Wang |
| 6,141,075 | A | 10/2000 | Ohmuro et al. | 6,922,287 B2 * | 7/2005 | Wiki et al. .................. 359/569 |
| 6,147,728 | A | 11/2000 | Okumura et al. | 6,926,410 B2 | 8/2005 | Weber et al. |
| 6,172,813 | B1 | 1/2001 | Tadic-Galeb et al. | 6,927,915 B2 * | 8/2005 | Nakai ........................ 359/569 |
| 6,172,816 | B1 | 1/2001 | Tadic-Galeb et al. | 6,934,082 B2 | 8/2005 | Allen et al. |
| 6,181,386 | B1 | 1/2001 | Knox | 6,954,245 B2 | 10/2005 | Mi et al. |
| 6,208,463 | B1 | 3/2001 | Hansen et al. | 6,972,906 B2 | 12/2005 | Hasman et al. |
| 6,215,547 | B1 | 4/2001 | Ramanujan et al. | 6,976,759 B2 | 12/2005 | Magarill et al. |
| 6,234,634 | B1 | 5/2001 | Hansen et al. | 6,981,771 B1 | 1/2006 | Arai et al. |
| 6,243,199 | B1 | 6/2001 | Hansen et al. | 7,013,064 B2 | 3/2006 | Wang |
| 6,247,816 | B1 | 6/2001 | Cipolla et al. | 7,023,512 B2 | 4/2006 | Kurtz et al. |
| 6,249,378 | B1 | 6/2001 | Shimamura et al. | 7,023,602 B2 | 4/2006 | Aastuen et al. |
| 6,250,762 | B1 | 6/2001 | Kuijper | 7,025,464 B2 | 4/2006 | Beeson et al. |
| 6,282,025 | B1 | 8/2001 | Huang et al. | 7,046,422 B2 | 5/2006 | Kimura et al. |
| 6,288,840 | B1 | 9/2001 | Perkins et al. | 7,046,441 B2 * | 5/2006 | Huang et al. ................ 359/486 |
| 6,310,345 | B1 | 10/2001 | Pittman et al. | 7,046,442 B2 * | 5/2006 | Suganuma .................. 359/486 |

| | | |
|---|---|---|
| 7,050,233 B2 | 5/2006 | Nikolov et al. |
| 7,075,722 B2 * | 7/2006 | Nakai ..................... 359/571 |
| 7,113,335 B2 | 9/2006 | Sales |
| 7,131,737 B2 | 11/2006 | Silverstein et al. |
| 7,142,363 B2 | 11/2006 | Sato et al. |
| 7,155,073 B2 * | 12/2006 | Momoki et al. .............. 385/11 |
| 7,158,302 B2 | 1/2007 | Chiu et al. |
| 7,159,987 B2 | 1/2007 | Sakata |
| 7,177,259 B2 | 2/2007 | Nishi et al. |
| 7,185,984 B2 | 3/2007 | Akiyama |
| 7,213,920 B2 | 5/2007 | Matsui et al. |
| 7,221,420 B2 | 5/2007 | Silverstein et al. |
| 7,221,501 B2 | 5/2007 | Flagello et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 2001/0006421 A1 | 7/2001 | Parriaux |
| 2001/0022687 A1 | 9/2001 | Takahashi et al. |
| 2002/0001128 A1 | 1/2002 | Moseley et al. |
| 2002/0003661 A1 * | 1/2002 | Nakai ..................... 359/569 |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0156325 A1 * | 8/2003 | Hoshi ..................... 359/486 |
| 2003/0161029 A1 | 8/2003 | Kurtz et al. |
| 2003/0180024 A1 | 9/2003 | Edlinger et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2004/0008416 A1 | 1/2004 | Okuno |
| 2004/0042101 A1 | 3/2004 | Wang et al. |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0045799 A1 | 3/2005 | Deng et al. |
| 2005/0046941 A1 | 3/2005 | Satoh et al. |
| 2005/0078374 A1 | 4/2005 | Taira et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 * | 9/2005 | Hirai et al. .................. 359/569 |
| 2005/0201656 A1 | 9/2005 | Nikolov et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0092513 A1 | 5/2006 | Momoki |
| 2006/0113279 A1 | 6/2006 | Little |
| 2006/0118514 A1 | 6/2006 | Little et al. |
| 2006/0119937 A1 | 6/2006 | Perkins et al. |
| 2006/0127829 A1 * | 6/2006 | Deng et al. .................. 431/188 |
| 2006/0187416 A1 | 8/2006 | Ouchi et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |

FOREIGN PATENT DOCUMENTS

| | | |
|---|---|---|
| CH | 0296391 | 2/1954 |
| CN | 03815026.3 | 8/2005 |
| CN | 1692291 | 11/2005 |
| CN | 03814105.1 | 11/2005 |
| DE | 416157 | 7/1925 |
| DE | 296391 | 2/1950 |
| DE | 3707984 A1 | 9/1988 |
| DE | 103 27 963 | 1/2005 |
| EP | 0336334 B1 | 10/1989 |
| EP | 0349309 B1 | 1/1990 |
| EP | 0357946 B1 | 3/1990 |
| EP | 407830 B1 | 1/1991 |
| EP | 416157 A1 | 3/1991 |
| EP | 0488544 A1 | 6/1992 |
| EP | 0507445 A2 | 10/1992 |
| EP | 0518111 A1 | 12/1992 |
| EP | 0543061 A1 | 5/1993 |
| EP | 566 004 | 10/1993 |
| EP | 0588937 B1 | 3/1994 |
| EP | 0606940 A2 | 7/1994 |
| EP | 0349144 B1 | 9/1994 |
| EP | 0634674 A2 | 1/1995 |
| EP | 0670506 A1 | 9/1995 |
| EP | 0521591 B1 | 10/1995 |
| EP | 0731456 | 9/1996 |
| EP | 0744634 A2 | 11/1996 |
| JP | 56156815 | 12/1981 |
| JP | 02-308106 | 12/1990 |
| JP | 3005706 | 1/1991 |
| JP | 04 366916 | 6/1991 |
| JP | 4-12241 | 1/1992 |
| JP | 5134115 | 5/1993 |
| JP | 5288910 | 11/1993 |
| JP | 7005316 | 1/1995 |
| JP | 7-146469 | 6/1995 |
| JP | 9090122 | 4/1997 |
| JP | 9090129 | 4/1997 |
| JP | 9178943 | 7/1997 |
| JP | 09-507926 | 8/1997 |
| JP | 9288211 | 11/1997 |
| JP | 10-003078 | 1/1998 |
| JP | 10073722 A | 3/1998 |
| JP | 10084502 | 3/1998 |

| | | |
|---|---|---|
| JP | 10-153706 | 6/1998 |
| JP | 10-260403 | 9/1998 |
| JP | 10-268301 | 10/1998 |
| JP | 11142650 | 5/1999 |
| JP | 11237507 | 8/1999 |
| JP | 11-306581 | 11/1999 |
| JP | 2000-147487 | 5/2000 |
| JP | 2000284117 | 10/2000 |
| JP | 2001074935 | 3/2001 |
| JP | 2004157159 | 6/2004 |
| JP | 2004309903 | 11/2004 |
| JP | 2005513547 | 5/2005 |
| JP | 2005195824 | 7/2005 |
| JP | 2005534981 | 11/2005 |
| JP | 2006047813 | 2/2006 |
| JP | 2006201540 | 8/2006 |
| KR | 10-2003-0079268 | 10/2003 |
| KR | 10-2003-0090021 | 11/2003 |
| KR | 10-2004-0046137 | 6/2004 |
| RU | 1781659 A1 | 12/1992 |
| SU | 1283685 | 1/1987 |
| WO | WO96/15474 | 5/1996 |
| WO | WO 97/01788 | 1/1997 |
| WO | WO0070386 | 11/2000 |
| WO | WO01/89677 | 4/2001 |
| WO | WO03/054619 | 7/2003 |
| WO | WO03/102652 | 12/2003 |
| WO | WO03/107046 | 12/2003 |
| WO | WO2004013684 | 2/2004 |
| WO | WO2004/019070 | 3/2004 |
| WO | WO2004/072692 | 8/2004 |
| WO | WO2005019503 | 3/2005 |
| WO | WO2005/065182 | 7/2005 |
| WO | WO2005079233 | 9/2005 |
| WO | WO2005/101112 | 10/2005 |
| WO | WO2005/123277 | 12/2005 |
| WO | WO2006/014408 | 2/2006 |
| WO | WO2006/036546 | 4/2006 |

OTHER PUBLICATIONS

Brummelaar et al., "Beam combining optical components," Chara Technical Report, Jan. 5, 1998, pp. TR61-1 to TR 61-17, No. 61.
Bruzzone, et al.,"High-performance LCoS optical engine using cartesian polarizer technlogy," SID 03 Digest, 2003, pp. 1-4.
Fritsch, et al., "A liquid-crystal phase modulator for large-screen projection." IEEE, Sep. 1989, pp. 1882-1887, vol. 36, No. 9.
Deguzman et al., "Stacked subwavelength gratings as circular polarization filters." Applied Optices, Nov. 1, 2001, pp. 5731-5737, vol. 40, No. 31.
Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tamada et al., "Aluminum-wire grid polarizer for a compact magneto-optic pickup device." 2 pages.
Brown, Thomas Benjamin, Lloyd William Taylor, Manual of Advanced Undergraduate Experiments in Physics, p. 302 (1959).
Flanders, Application of ≈100 Ålinewidth structures fabricated by shadowing technique$^{a)}$, J. Vac. Sci. Technol., 19(4), Nov./Dec. 1981, pp. 892-895.
Kuta et al. "Coupled-wave analysis of lamellar metal transmission gratings for the visible and the infrared," J. Opt. Soc. Am. A/vol. 12, No. 5/May 1995, pp. 1118-1127.
Lochbihler et al. "Diffraction from highly conducting wire gratings of arbitrary cross-section," Journal of Modern Optics, 1993, vol. 40, No. 7, pp. 1273-1298.
Novak et al., "Far infrared polarizing grids for use at cryogenic temperatures," Applied Optics, Aug. 15, 1989/vol. 28, No. 15, pp. 3425-3427.
Auton et al, "Grid Polarizers for Use in the Near Infrared," Infrared Physics, 1972, vol. 12, pp. 95-100.
Handbook of Optics, 1978, pp. 10-68, and 10-72 through 10-77, editor, Harold B. Crawford et al.

Glytsis et al, "High-spatial-frequency binary and multilevel stairstep gratings: polarization-selective mirrors and broadband antireflection surfaces," Applied Optics Aug. 1, 1992 vol. 31, No. 22 pp. 4459-4470.
Auton, "Infrared Transmission Polarizers by Photolithography,"Applied Optics, Jun. 1967 vol. 6, No. 6, pp. 1023-1027.
Haggans et al., "Lamellar gratings as polarization components for specularly reflected beams," Journal of Modern Optics, 1993, vol. 40, No. 4, pp. 675-686.
Nordin et al., "Micropolarizer array for infrared imaging polarimetry", J. Op. Soc. Am. vol. 16 No. 5/May 1999, pp. 1168-1174.
Bird et al., "The Wire Grid as a Near-Infrared Polarizer," J. Op. Soc. Am. vol. 50 No. 9 (1960), 886-891.
Fincham et al., "Linear Polarization by anisotrophy-crystals and grids." Optics $9^{th}$ Edition, pp. 338-339 (1980).
Whitbourn et al, "Phase shifts in transmission line models of thin periodic metal grids," Applied Optics Aug. 15, 1989 vol. 28, No. 15, pp. 3511-3515.
Enger et al, "Optical elements with ultrahigh spatial-frequency surface corrugations," Applied Optics Oct. 15, 1983, vol. 22, No. 20 pp. 3220-3228.
Knop, "Reflection Grating Polarizer for the Infrared," Optics Communications vol. 26, No. 3, Sep. 1978, pp. 281-283.
Hass et al, "Sheet Infrared Transmission Polarizers," Applied Optics Aug. 1965, vol. 4, No. 8 pp. 1027-1031.
Flanders, "Submicrometer periodicity gratings as artificial anisotropic dielectrics," Appl. Phys. Lett. 42 (6), Mar. 15, 1983, pp. 492-494.
Li Li et al , "Visible broadband, wide-angle, thin-film multilayer polarizing beam splitter," Applied Optics May 1, 1996, vol. 35, No. 13, pp. 2220-2225.
Sonek et al., "Ultraviolet grating polarizers," J. Vac. Sci. Technol., 19(4), Nov./Dec. 1981, pp. 921-923.
N.M. Ceglio, Invited Review "Revolution in X-Ray Optics", J. X-Ray Science & Tech. 1, pp. 7-78 (1989).
Dainty, et al, "Measurements of light scattering by characterized random rough surface", Waves in Random Media 3 (1991), pp. 529-531, 534-539.
DeSanto et al, "Rough surface scattering", Waves in Random Media 1(1991), pp. S41, S47, S52 and S53.
Zanzucchi et al., "Corrosion Inhibitors for Aluminum Films" Journal of Electrochem Soc., vol. 135. No. 6, Jun. 1988, pp. 1370-1375, David Sarnoff Research Center, Princeton, NJ 08543-5300.
Moshier et al. "The Corrosion and Passively of Aluminum Exposed to Dilute Sodium Sulfate Solutions." Corrosion Science vol. 27. no. 8 pp. 785-801 1987.
Scandurra, et al. "Corrosion Inhibition of Al Metal in Microelectronic Devices Assemble in Plastic Packages." Journal of the Electrochemical Society, 148 (8) B289-B292 (2001).
Takano, Kuniyoshi et al. "Cube polarizers by the use of metal particles in anodic alumina films." Applied Optics, vol. 33, No. 16, 3507-3512, Jun. 1, 1994.
Lopez, et al. "Wave-plate polarizing beam splitter based on a form-birefringent multilayer grating." Optics Letters, vol. 23, No. 20, pp. 1627-1629, Oct. 15, 1998.
Chen, J. et al. "Optimum film compensation modes for TN and VA LCDs" SID 98 Digest, pp. 315-318, 1998.
Richter, Ivan et al. "Design considerations of form birefringent microstructures." Applied Optics, vol. 34, No. 14, pp. 2421-2429, May 10, 1995.
Tyan, Rong-Chung et al. "Design, fabrication, and characterization of form-birefringent multilayer polarizing beam splitter." Optical Society of America, vol. 14, No. 7, pp. 1627-1636, Jul. 1997.
Ho, G H et al. "The mechanical-optical properties of wire-grid type polarizer in projection display system." SID 02 Digest, pp. 648-651, 2002.
Kostal, Hubert, NanoTechnology "using advanced lithography to pattern nano-optic devices" www.solid-state.com, Sep. 2005, p. 26 and 29.
Kostal, Hubert "Nano-optics: robust, optical devices for demanding applications" Military & Aerospace Electronics, Jul. 2005, 6 pages.

Kostal, Hubert "Nano-optic devices enable integrated fabrication" www.laserfocuswold.com, Jun. 2004 pp. 155, 157-159.

Wang, Jian et al. "Free-Space nano-optical devices and integration: design, fabrication, and manufacturing" Bell Labs Technical Journal, 2005 pp. 107-127, vol. 10, No. 3.

Wang et al. "Diffractive optics: nanoimprint lithography enables fabrication of subwavelength optics" LaserFocusWorld, http://lfw.pennnet.com/Articles/Article_Dispaly.cf... Apr. 19, 2006, 6 pages.

Wang et al. "High-performance nanowire-grid polarizers" Optical Society of America 2005, pp. 195-197, vol. 30, No. 2.

Wang et al. "Fabrication of a new broadband waveguide polarizer with a double-layer 190 nm period metal-gratings using nanoimprint lithography" Journal Vac. Sci. Technology B, Nov./Dec. 1999, pp. 2957-2960, vol. 17, No. 6.

Savas et al. "Achromatic interferometric lithography for 100-nm-period gratings and grids" Journal Vac. Sci. Technology B, Nov./Dec. 1995, pp. 2732-2735, vol. 13, No. 6.

Haisma et al. "Mold-assisted nanolithography: a process for reliable pattern replication" Journal Vac. Sci. Technology B, Nov./Dec. 1996, pp. 4124-4128, vol. 14, No. 6.

Wang et al. "High-performance large-area ultra-broadband (UV to IR) nanowire-grid polarizers and polarizing beam-splitters" Proc. of SPIE 2005, pp. 1-12, vol. 5931.

Wang et al. "Monolithically integrated isolators based on nanowire-grid polarizers" IEEE, Photonics Technology Letters, Feb. 2005, pp. 396-398, vol. 17, No. 2.

Deng et al. "Multiscale structures for polarization control by using imprint and UV lithography" Proc. of SPIE, 2005, pp. 1-12. vol. 6003.

Kostal et al. "MEMS Meets Nano-optics the marriage of MEMES and nano-optics promises a new and viable platform for tunable optical filters" www.fiberoptictechnology.net, Fiber Optic Technology, Nov. 2005, pp. 8-13.

Kostal et al. "Adding parts for a greater whole" SPIE's oeMagazine, May 2003, pp. 24-26.

Deng et al. "Wideband antireflective polarizers based on integrated diffractive multilayer microstructures" Optics Letters, Feb. 1, 2006, pp. 344-346, vol. 31., No. 3.

Chen, et al. "Novel polymer patterns formed by lithographically induced self-assembly (LISA)", American Chemical Society, Jan. 2005, pp. 818-821, vol. 21, No. 3.

Perkins, et al., U.S. Appl. No. 11/640,112, filed Dec. 15, 2006.

Baur, "A new type of beam splitting polarizer cube," Meadowlark Optics, 2005, pp. 1-9.

* cited by examiner

INORGANIC, DIELECTRIC, GRID POLARIZER AND NON-ZERO ORDER DIFFRACTION GRATING

RELATED APPLICATIONS & PRIORITY CLAIM

This is a continuation-in-part of U.S. patent application Ser. No. 11/640,112 filed Dec. 15, 2006, which is a continuation-in-part of U.S. patent application Ser. No. 11/005,927 filed Dec. 6, 2004, U.S. Pat. No. 7,570,424, which is herein incorporated by reference.

This is a continuation-in-part of U.S. patent application Ser. Nos. 11/469,210; 11/469,226; 11/469,241 (abandon); 11/469,253 abandon and 11/469,266 (abandoned), filed Aug. 31, 2006; which are herein incorporated by reference.

This is related to U.S. patent application Ser. Nos. 11/475,857 and 11/478,459, filed Jun. 26, 2006; which are herein incorporated by reference.

BACKGROUND

1. Field of the Invention

The present invention relates generally to a combined inorganic, dielectric grid polarizer and diffraction grating to polarize and further control light, such as by reducing zero order back reflection.

2. Related Art

Diffraction gratings are a periodic structure of dielectric material with a period (p) greater than half the wavelength ($\lambda$) of incident light, or $p \geq \lambda/2$. The diffraction grating scatters the incident light at discrete angles or directions in accordance with $m\lambda = p \sin \theta$, where m is the order and $\theta$ is the angle with respect to normal from the diffraction grating. Thus, different wavelengths are reflected or scattered at different angles.

Wire grid polarizers are a periodic structure of conductive elements with a length greater than the wavelength and a period less than half the wavelength of the incident light, or $p \geq \lambda/2$. Wire grid polarizers have been proven to be effective for visible light (~300-700 nm, or ~0.3-0.7 microns or μm) and their use demonstrated as polarizers and beam splitters in optical imaging systems.

Various imaging systems, such as projection displays, using liquid crystal spatial light modulators, such as liquid crystal on silicon (LCOS), have been proposed that utilize polarizers, such as wire grid polarizers. For example, see U.S. Pat. Nos. 6,234,634 and 6,447,120. Such polarizers, however, can also back reflect a portion of the incident light resulting in a ghost image. One solution has been to tilt or angle the polarizer to direct the back reflection out of or away from the optical path. Tilting the polarizer, however, can take-up valuable space in a compact design, and can cause unwanted astigmatism. In addition, the conductive metal of the wires can absorb light.

Various types of polarizers or polarizing beam splitters (PBS) have been developed for polarizing light, or separating orthogonal polarization orientations of light. A MacNeille PBS is based upon achieving Brewster's angle behavior at the thin film interface along the diagonal of the high refractive index cube in which it is constructed. Such MacNeille PBSs generate no astigmatism, but have a narrow acceptance angle, and have significant cost and weight.

Another polarizing film includes hundreds of layers of polymer material stretched to make the films birefringent. Such stretched films have relatively high transmission contrast, but not reflection contrast. In addition, polymer materials are organic and not as capable of withstanding higher temperatures or higher energy flux. For example, see Vikuiti™ polarizing films by 3M.

Composite wire-grid polarizers have been proposed in which the wires include alternating layers of dielectric and conductive layers. For example, see U.S. Pat. Nos. 6,532,111; 6,665,119 and 6,788,461. Such polarizers, however, still have conductive materials.

SUMMARY OF THE INVENTION

It has been recognized that it would be advantageous to develop a polarizer device capable of reducing back reflection, and thus capable of reducing ghost images when used in an imaging system or display system. In addition, it has been recognized that it would be advantageous to develop a polarizer device capable of polarizing and further controlling the light, such as the direction or modes of reflection. In addition, it has been recognized that it would be advantageous to develop a non-zero order type polarizer device capable of polarizing light while reflecting only light of non-zero order, and without reflecting light of the zero order. Furthermore, it has been recognized that it would be advantageous to develop an imaging system with such a wire grid polarizer or polarizer device capable of conserving space in the optical design, and capable reducing ghost images and unwanted astigmatism. It has been recognized that it would be advantageous to develop a polarizer or polarizing beam splitter that has high contrast in reflection and/or transmission, can withstand high temperatures and/or high energy flux, and that is simpler to manufacture. In addition, it has been recognized that it would be advantageous to develop a polarizer that is inorganic and dielectric.

The invention provides an inorganic, dielectric grid polarizer configured to polarize and further control light incident on the device and includes an optical stack with a diffraction grating and an inorganic, dielectric grid polarizer, with one disposed over the other and configured to be disposed in the light. The inorganic, dielectric grid polarizer includes: a stack of film layers, each film layer being formed of a material that is both inorganic and dielectric; adjacent film layers having different refractive indices; at least one of the film layers being discontinuous to form a form birefringent layer with an array of parallel ribs in accordance with $P_{GP} < \lambda/2$ where $P_{GP}$ is the period of the ribs and $\lambda$ is the wavelength of the light, to polarize the light by substantially reflecting the light with s-polarization orientation and substantially transmitting the incident light with p-polarization orientation. The diffraction grating includes an array of elongated parallel dielectric ribs in accordance with $P_{DG} > \lambda/2$ where $P_{DG}$ is the period of the ribs, to substantially diffract light with the s-polarization orientation of non-zero order at a non-orthogonal angle. The diffraction grating and the grid polarizer together pass light having p-polarization orientation while diffracting light having s-polarization orientation.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1b is a detailed cross-sectional side view of the polarizer device of FIG. 1a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms polarizer and polarizing beam splitter are used interchangeably herein. Both are referred to herein as polarizers or polarizer devices.

The term dielectric is used herein to mean non-metallic.

The term continuous is used here to denote continuous in at least two dimensions, such as continuous in a plane or continuous across a planar surface in both directions.

Description

Figure 1A:
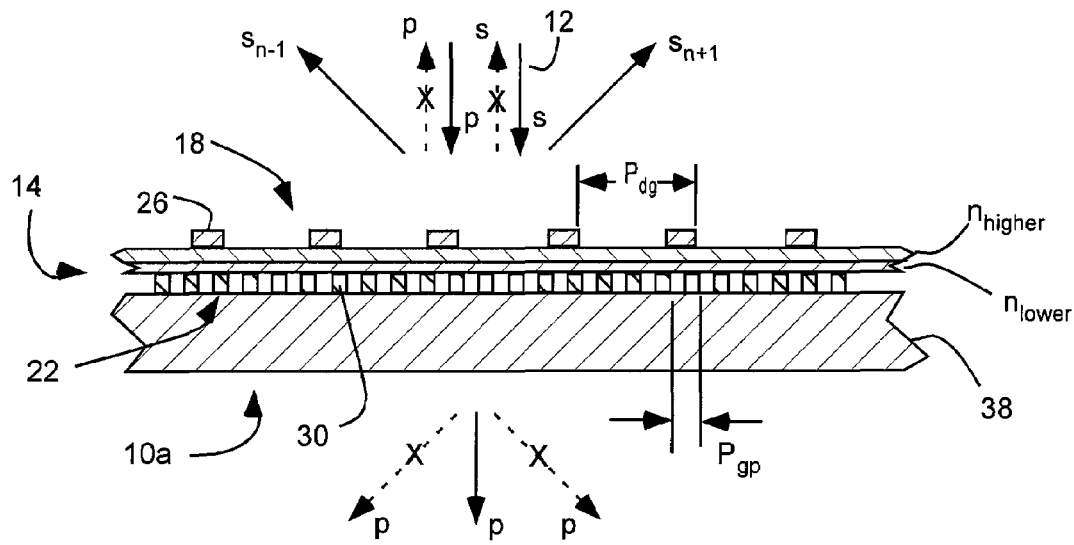
FIG. 1a is a cross-sectional side view of a polarizer device in accordance with an embodiment of the present invention.
Figure 1B:
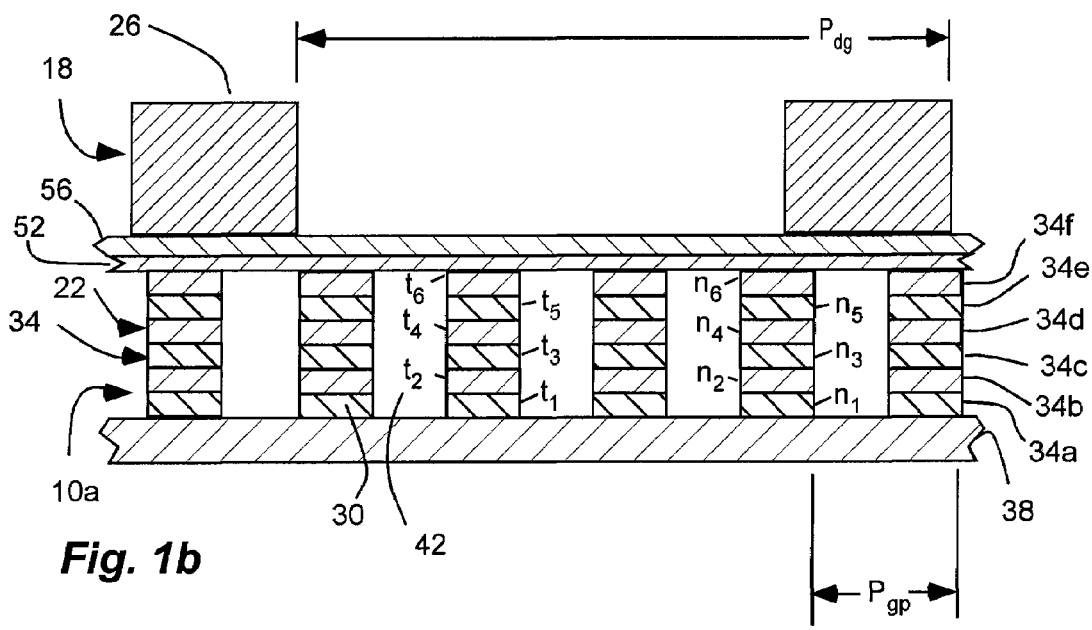
Figure 1C:
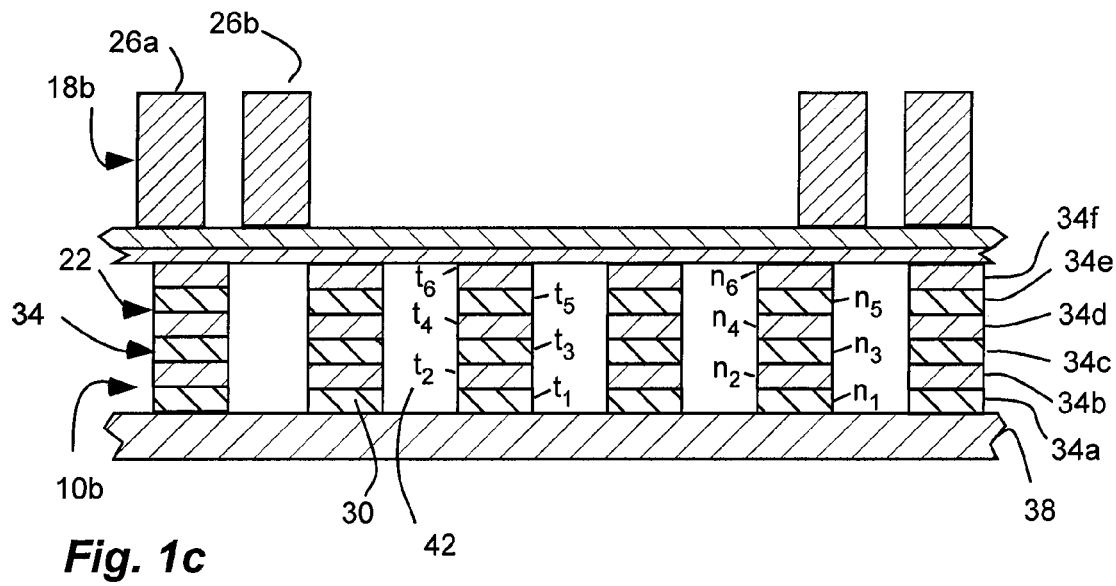
FIG. 1c is a cross-sectional side view of another polarizer device in accordance with another embodiment of the present invention.
Figure 2:
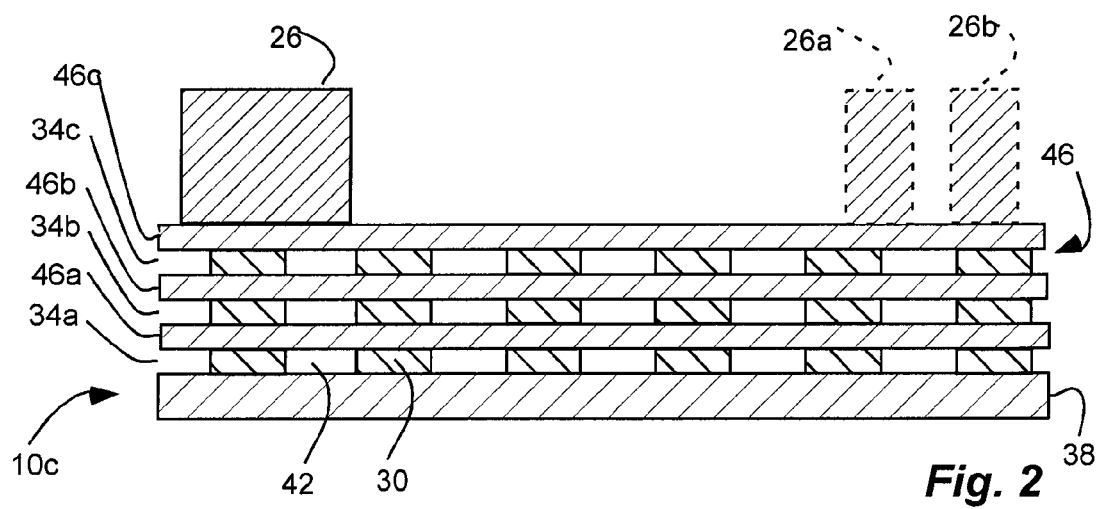
FIG. 2 is a cross-sectional side view of another polarizer device in accordance with another embodiment of the present invention.

As illustrated in FIGS. 1a-2, polarizer devices in exemplary implementations of the invention are shown which can be used to polarize and further control light, and which can be used with image or display systems. Such polarizer devices can polarize and further control light, such as by reducing zero order reflections, or back reflection. Such polarizer devices can be a combination of an inorganic, dielectric grid polarizer and a diffraction grating, configured to reduce zero order back reflections of s-polarized light. It will be appreciated that other configurations are possible depending on the intended application. As illustrated in FIGS. 9-15, image or display systems in exemplary implementations of the invention are shown using polarizer devices in accordance with FIGS. 1a-2. Such display systems can utilize such polarizer devices to reduce ghost images, conserve space in the optical design by being oriented orthogonal to the incident light, and thus reduce unwanted astigmatism. It will be appreciated that other applications are possible, including for example fiber optics.

Figure 4:
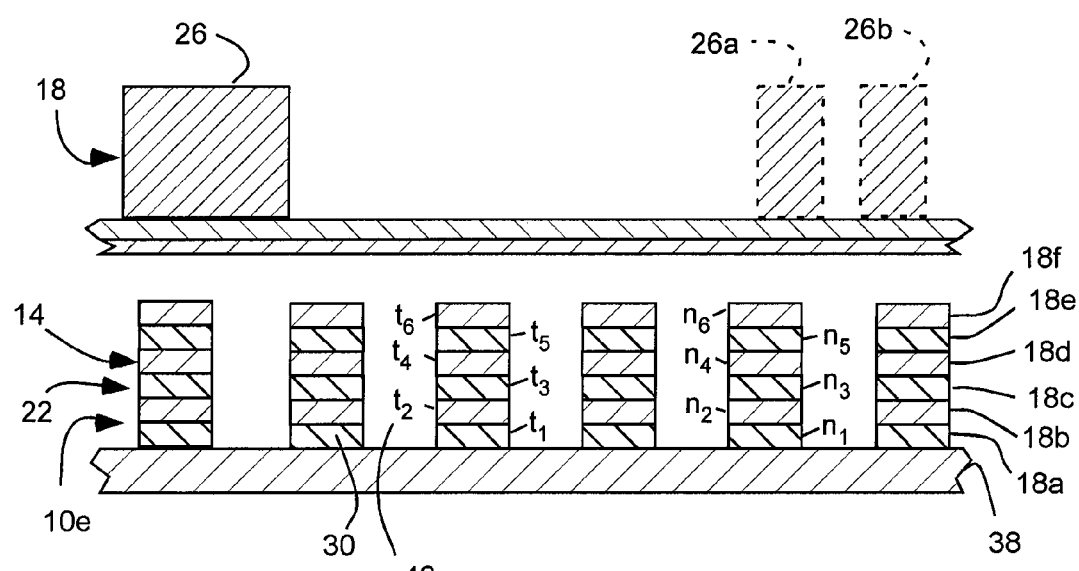
FIG. 4 is a cross-sectional side view of another polarizer device in accordance with another embodiment of the present invention.

Referring to FIGS. 1a and 1b, a polarizer device 10a is shown disposed in a beam of incident light or an incident light beam 12. Such an incident light beam 12 can be an unpolarized light beam, a polarized light beam, an light beam with image information encoded thereon, an image beam, a color beam, etc. The polarizer device 10a includes an optical stack 14 with a plurality of layers. In one aspect, the device 10a or optical stack 14 is oriented normal or orthogonal ($\theta = \sim 0$) to the incident light beam 12. The optical stack includes a diffraction grating 18 and an inorganic, dielectric grid polarizer 22 disposed one over the other. In one aspect, the diffraction grating 18 is stacked over the grid polarizer 22, with the visible light beam incident on the diffraction grating, or encountering the diffraction grating prior to encountering the grid polarizer. Thus, the incident light beam first encounters the diffraction grating, and subsequently encounters the grid polarizer. In addition, the diffraction grating 18 can "face" the incident light beam, or be oriented so that the incident light beam strikes the ribs of the diffraction grating. It is of course understood that the diffraction grating may be covered with further layers, or that the optical stack can include additional layers over the diffraction grating, such as anti-reflective coatings, etc. The diffraction grating 18 and grid polarizer 22 can be combined together, or affixed together, in a single unit or optical stack to conserve space in an optical design, and for ease of handling or installing. Alternatively, a device 10e can include the diffraction grating 18 and the grid polarizer 22 spaced-apart from one another to facilitate fabrication, as shown in FIG. 4.

The diffraction grating 18 can include an array of elongated parallel dielectric ribs 26 with a period in accordance with $P_{DG} > \lambda/2$, where $P_{DG}$ is the period of the ribs (and $\lambda$ is the wavelength of the visible light beam). In one aspect, the period $P_{GD}$ can be greater than 0.21 microns and less than 0.7 microns. (As described below, the period of the diffraction grating can be approximately five times greater than the period of the grid polarizer.) Thus, the diffraction grating diffracts reflected or transmitted light, and specifically substantially diffracts light with the s-polarization orientation of non-zero order at a non-orthogonal angle ($\theta \neq 0$) or angle greater than zero ($\theta > 0$). Furthermore, each rib 26 of a diffraction grating 18b of a device 10b can be split into at least a pair of ribs 26a and 26b, as shown in FIG. 1c. It is believed that splitting the ribs 26 facilitates diffraction of non-zero order, as described below. Thus, the diffraction grating 18 includes a periodic array of rib pairs. The split can be longitudinal resulting in two relatively proximal or adjacent ribs.

The inorganic, dielectric grid polarizer 22 includes an array of elongated, parallel ribs 30 with a period in accordance with $P_{GP} < \lambda/2$ where $P_{GP}$ is the period of the wires (and $\lambda$ is the wavelength of the visible light beam). In one aspect, the period can be less than about 0.21 microns to polarize the incident light. The grid polarizer 22 substantially reflects the incident light with s-polarization orientation, and substantially transmits the incident light with p-polarization orientation.

The grid polarizer 22 can include a stack 34 of film layers 34a-34f disposed over a substrate 38. The substrate 38 can be formed of an inorganic and dielectric material, such as BK7 glass. In addition, the film layers 34a-34f, and thus the stack 34, can be formed of inorganic and dielectric materials. Thus, the entire polarizer can be inorganic and dielectric, or formed of only inorganic and dielectric materials.

In addition, the dielectric material can further be optically transmissive with respect to the incident light. Furthermore, the dielectric material can further have negligible absorption. Thus, the light incident on the grid polarizer is not absorbed, but reflected and transmitted.

The material of each film layer can have a refractive index n. Adjacent film layers have different refractive indices ($n_1 \neq n_2$). In one aspect, film layers alternate between higher and lower refractive indices (for example $n_1 < n_2 > n_3$; $n_1 > n_2 < n_3$; $n_1 < n_2 < n_3$ or $n_1 > n_2 > n_3$). In addition, the first film layer 34a can have a different refractive index $n_1$ than the refractive index $n_s$ of the substrate 38 ($n_1 \neq n_s$). The stack of film layers can have a basic pattern of two or more layers with two or more reflective indices, two or more different thicknesses, and two or more different materials. This basic pattern can be repeated.

In addition, the thickness of each layer can be tailored to transmit substantially all light of p-polarization orientation, and to reflect substantially all light of s-polarization orientation. Therefore, while the thicknesses $t_{1-6}$ shown in the figures are the same, it will be appreciated that they can be different.

While the stack 34 is shown with six film layers 34a-f, it will be appreciated that the number of film layers in the stack can vary. In one aspect, the stack can have between three and twenty layers. It is believed that less than twenty layers can achieve the desired polarization. In addition, while the film layers are shown as having the same thickness, it will be appreciated that the thicknesses of the film layers can vary, or can be different. The thickness of all the film layers in the stack over the substrate can be less than 2 micrometers.

At least one of the film layers is discontinuous to form a form birefringent layer with an array of parallel ribs 30. The ribs have a pitch or period $P_{GP}$ less than the wavelength being treated, and in one aspect less than half the wavelength being treated. For visible light applications ($\lambda \approx 400$-$700$ nm), such as projection display systems, the ribs can have a pitch or period less than 0.35 microns or micrometers (0.35 μm or 350 nm) for visible red light ($\lambda \approx 700$ nm) in one aspect; or less than 0.20 microns or micrometers (0.20 μm or 200 nm) for all visible light in another aspect. For infrared applications ($\lambda \approx 1300$-$1500$ nm), such as telecommunication systems, the ribs can have a pitch or period less than 0.75 micron or micrometer (0.75 μm or 750 nm) in one aspect, or less than 0.4 microns or micrometers (0.40 μm or 400 nm) in another aspect. Thus, an incident light beam 12 incident on the polarizer 22 separates the light into two orthogonal polarization orientations, with light having s-polarization orientation (polarization orientation oriented parallel to the length of the ribs) being reflected, and light having p-polarization orientation (polarization orientation oriented perpendicular to the length of the ribs) being transmitted or passed. (It is of course understood that the separation, or reflection and transmission, may not be perfect and that there may be losses or amounts of undesired polarization orientation either reflected and/or transmitted.) In addition, it will be noted that the array or grid of ribs with a pitch less than about half the wavelength of light does not act like a diffraction grating (which has a pitch about half the wavelength of light). Thus, the grid polarizer avoids diffraction. Furthermore, it is believed that such periods also avoid resonant effects or anomalies.

As shown in FIG. 1b, all of the film layers are discontinuous and form the array of parallel ribs 30. The ribs 30 can be separated by intervening grooves 42 or troughs. In this case, the grooves 42 extend through all the film layers 34a-34f to the substrate 38. Thus, each rib 30 is formed of a plurality of layers. In addition, all the film layers are form birefringent. As discussed below, such a configuration can facilitate manufacture.

The grooves 42 can be unfilled, or filed with air (n=1). Alternatively, the grooves 42 can be filled with a material that is optically transmissive with respect to the incident light.

In one aspect, a thickness of all the film layers in the stack over the substrate is less than 2 microns. Thus, the grid polarizer 22 can be thin for compact applications, and can be thinner than many multi-layered stretched film polarizers that have hundreds of layers.

It is believed that the birefringent characteristic of the film layers, and the different refractive indices of adjacent film layers, causes the grid polarizer 22 to substantially separate polarization orientations of incident light, substantially reflecting light of s-polarization orientation, and substantially transmitting or passing light of p-polarization orientation. In addition, it is believed that the number of film layers, thickness of the film layers, and refractive indices of the film layers can be adjusted to vary the performance characteristics of the grid polarizer.

Figure 3:
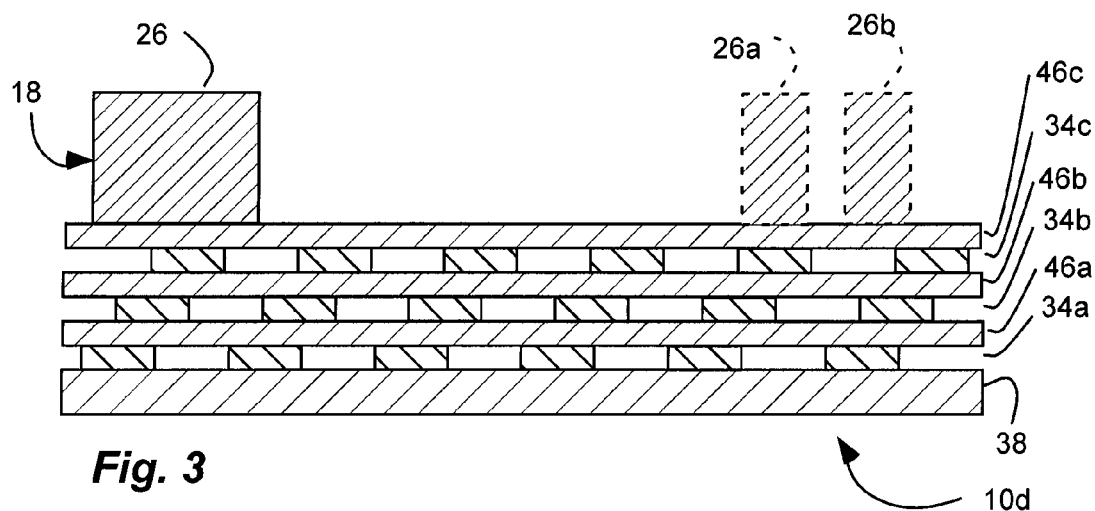
FIG. 3 is a cross-sectional side view of another polarizer device in accordance with another embodiment of the present invention.

Referring to FIG. 2, another polarizer device, indicated generally at 10c, is shown in an exemplary implementation in accordance with the present invention. The above description is incorporated by reference. The polarizer 10c includes a stack 46 of both discontinuous layers 34a-34c and continuous layers 46a-46c. In one aspect, the discontinuous and continuous layers can alternate, as shown. Having one or more continuous layers can provide structural support to the grid, particularly if the ribs are tall. In another aspect, the ribs of one layer can be aligned with the ribs of another layer as shown. Alternatively, a polarizer device 10d can have the ribs of one layer be off-set with respect to the ribs of another layer, as shown in FIG. 3. It is believed that the ribs can be aligned or off-set in order to tune or configure the polarizer 10c or 10d for a particular angle of incidence. For example, aligned ribs may be better suited for normal incident light, while the off-set ribs may be better suited for angled incident light.

In one aspect, the continuous layers can be formed of a material that is naturally birefringent, as opposed to form birefringent. Thus, the entire stack of thin film layers can be birefringent, without having to form ribs in the layers of naturally birefringent material.

Referring to FIG. 4, the polarizer device 10e can include separate and spaced-apart grid polarizer 22 and diffraction grating 18. A support structure (not shown) can hold the grid polarizer and the diffraction grating together for ease of handling or assembly. The diffraction grating 18 may include another substrate to support the ribs.

Figure 6:
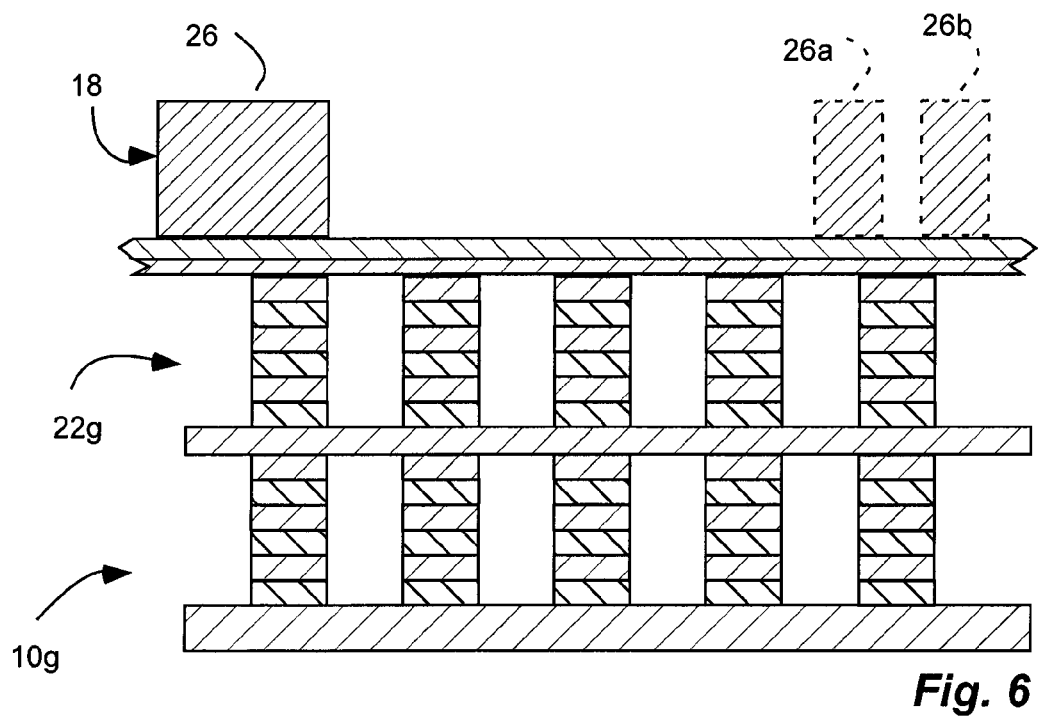
FIG. 6 is a cross-sectional side view of another polarizer device in accordance with another embodiment of the present invention.
Figure 7:
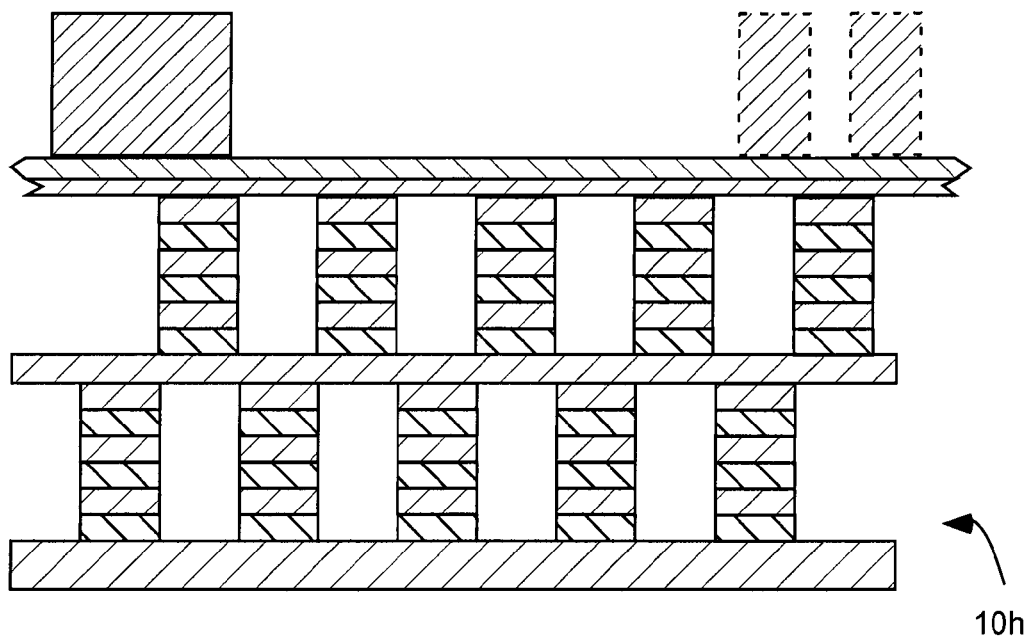
FIG. 7 is a cross-sectional side view of another polarizer device in accordance with another embodiment of the present invention.

Referring to FIGS. 6 and 7, other polarizer devices, indicated generally at 10g and 10h, are shown in exemplary implementations in accordance with the present invention. The above description is incorporated by reference. The grid polarizer 22g of the polarizer device 10g can have multiple discontinuous layers separate by one or more continuous layers. In addition, the grid polarizer 22g of the polarizer 10g can be similar to two polarizers described in FIG. 1 stacked one atop the other. The ribs can be aligned as in FIG. 6, or offset as in FIG. 7.

Figure 8:
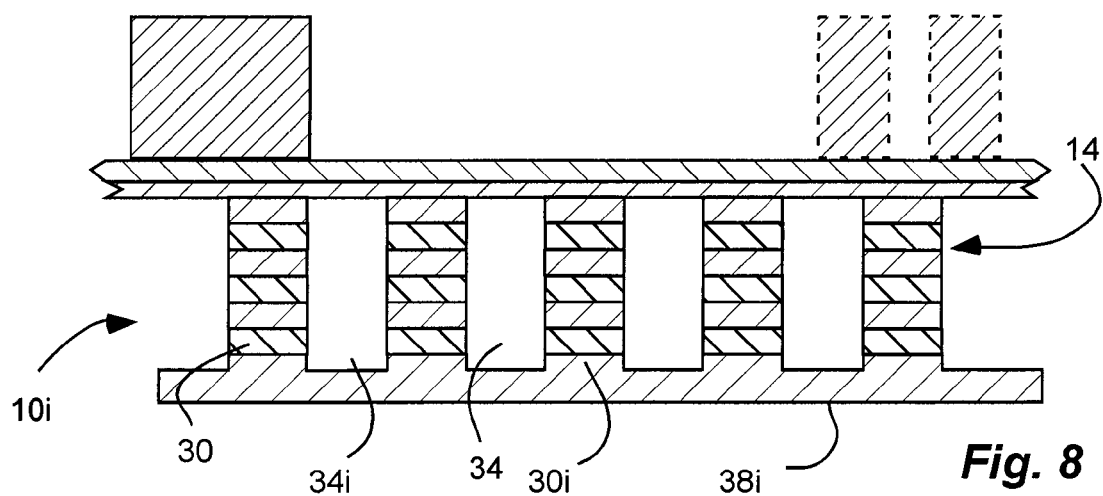
FIG. 8 is a cross-sectional side view of another polarizer device in accordance with another embodiment of the present invention.

Referring to FIG. 8, another polarizer device, indicated generally at 10i, is shown in an exemplary implementation in accordance with the present invention. The above description is incorporated by reference. The polarizer can include a plurality of ribs 30i formed in and extending from the substrate 38i itself. Thus, the ribs 30 formed in the film layers or the stack 14 of film layers can be disposed over or carried by the ribs 30i of the substrate. The ribs 30i of the substrate can define intervening grooves or troughs 34i that can be aligned with the grooves 34 of the film layers. With this configuration, a portion of the substrate 38i can form a form birefringent layer. The ribs 30i or grooves 34i can be formed by etching the substrate 38i, such as by over-etching the above layers.

Referring to FIG. 1, the operation of the device 10a (or those described above) or optical stack 14 is shown. Specifically, FIG. 1 shows the polarization and diffraction of s and p polarized light, including which orders are reduced or eliminated. Namely, the polarizer device 10a eliminates or reduces back reflection of both s-polarization orientation and p-polarization orientation (shown crossed out in dashed lines), and specifically eliminates or reduces back reflection of light having s-polarization orientation of zero order and diffracting light having s-polarization orientation of non-zero order. Thus, the rejected s-polarization orientation is not back reflected. FIG. 1 shows the resulting light beams and their polarization orientation (s or p). It can be seen that the diffraction grating 18 and the grid polarizer 22 together (or the device 10a or optical stack 14) pass light having p-polarization orientation while diffracting light having s-polarization orientation. More specifically, light with p-polarization orientation is substantially passed, light with s-polarization orientation is substantially reflected, but light with s-polarization orientation having a non-zero order is also diffracted, or reflected at a non-orthogonal or a non-zero angle ($\theta \neq 0$) or an angle greater than zero ($\theta > 0$). Thus, the resulting light is substantially transmitted p-polarized light and diffracted s-polarized light so that s-polarized light is not back reflected.

The array of inorganic, dielectric ribs 30 of the grid polarizer 22 and the array of dielectric ribs 26 of the diffraction grating 18 can be substantially parallel with one another, as shown. In other words, the ribs 30 can be parallel with the ribs 26. As stated above, the period $P_{GD}$ of the diffraction grating 18 can be greater than the period $P_{GP}$ of the grid polarizer 22. It is believed that a diffraction grating period $P_{GD}$ approximately five times greater ($P_{GD} \approx 5 P_{GP}$) than the grid polarizer period $P_{GP}$ will provide adequate diffraction of the light with s-polarization orientation or adequate reduction of light with the s-polarization orientation of zero-order. The arrays of both the ribs can be aligned so that the period of one begins at the period of another, as shown. Alternatively, the arrays can be staggered so that the starting period of one does not correspond to the other.

Referring to FIG. 1b, the optical stack 14 can also include at least two continuous layers disposed between the wire grid polarizer and the diffraction grating. The layers can have different refractive indices. A lower layer 52 can be disposed over the grid polarizer 22, and an upper layer 56 can be disposed over the lower layer 52. The upper layer 56 can have a refractive index $n_{upper}$ greater than a refractive index $n_{lower}$ of the lower layer 52 ($n_{upper} > n_{lower}$).

Figure 5:
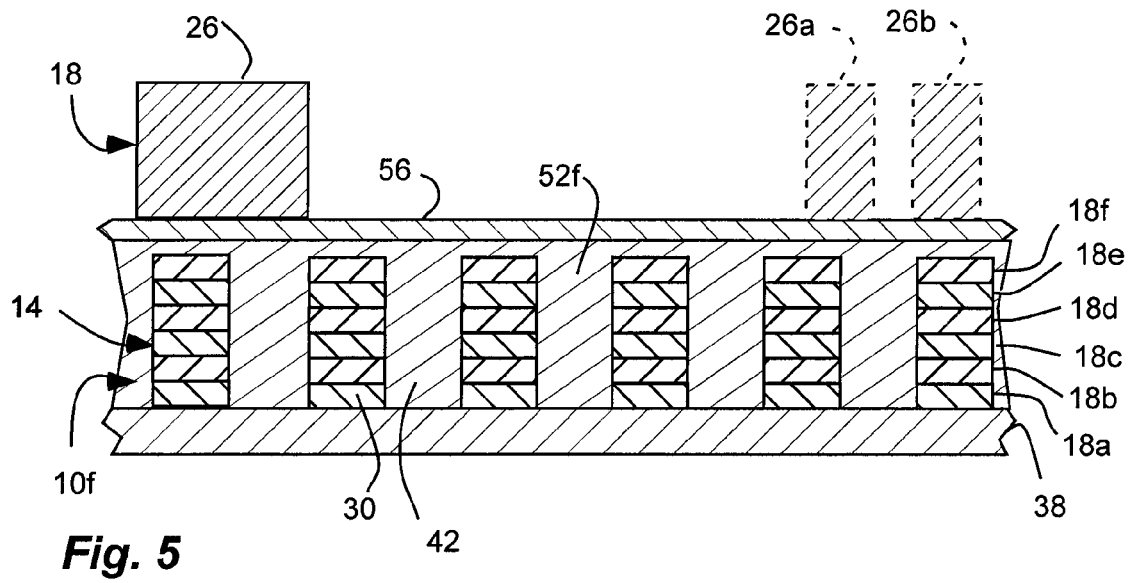
FIG. 5 is a cross-sectional side view of another polarizer device in accordance with another embodiment of the present invention.

The ribs 26 of the diffraction grating 18 and the ribs 30 of the grid polarizer 22 can form periodic structures or discontinuous layers with spaces between the ribs. The spaces between the ribs can contain a material different than the material of the ribs or wires. For example, the spaces between the ribs 30 can be filed with a dielectric material. As another example, a device 10f can have the lower layer 52f extend into the spaces between the ribs 30 of the grid polarizer 22, as shown in FIG. 5. Thus, in manufacture, the lower layer can be disposed directly over the grid polarizer. In addition, further layers may be disposed over the diffraction grating, including additional diffraction gratings. Furthermore, additional layers can be disposed between the diffraction grating and the grid polarizer, or between the substrate and the ribs.

The grid polarizer 22 can include, or the ribs 30 and optical stack 14 can be supported by, a substrate 38. The ribs 30 can be formed or deposited on the substrate, such as by using a lithography process. The other layers can be formed or deposited over the wires. Similarly, the ribs 26 can be formed using a lithography process.

Figure 9A:
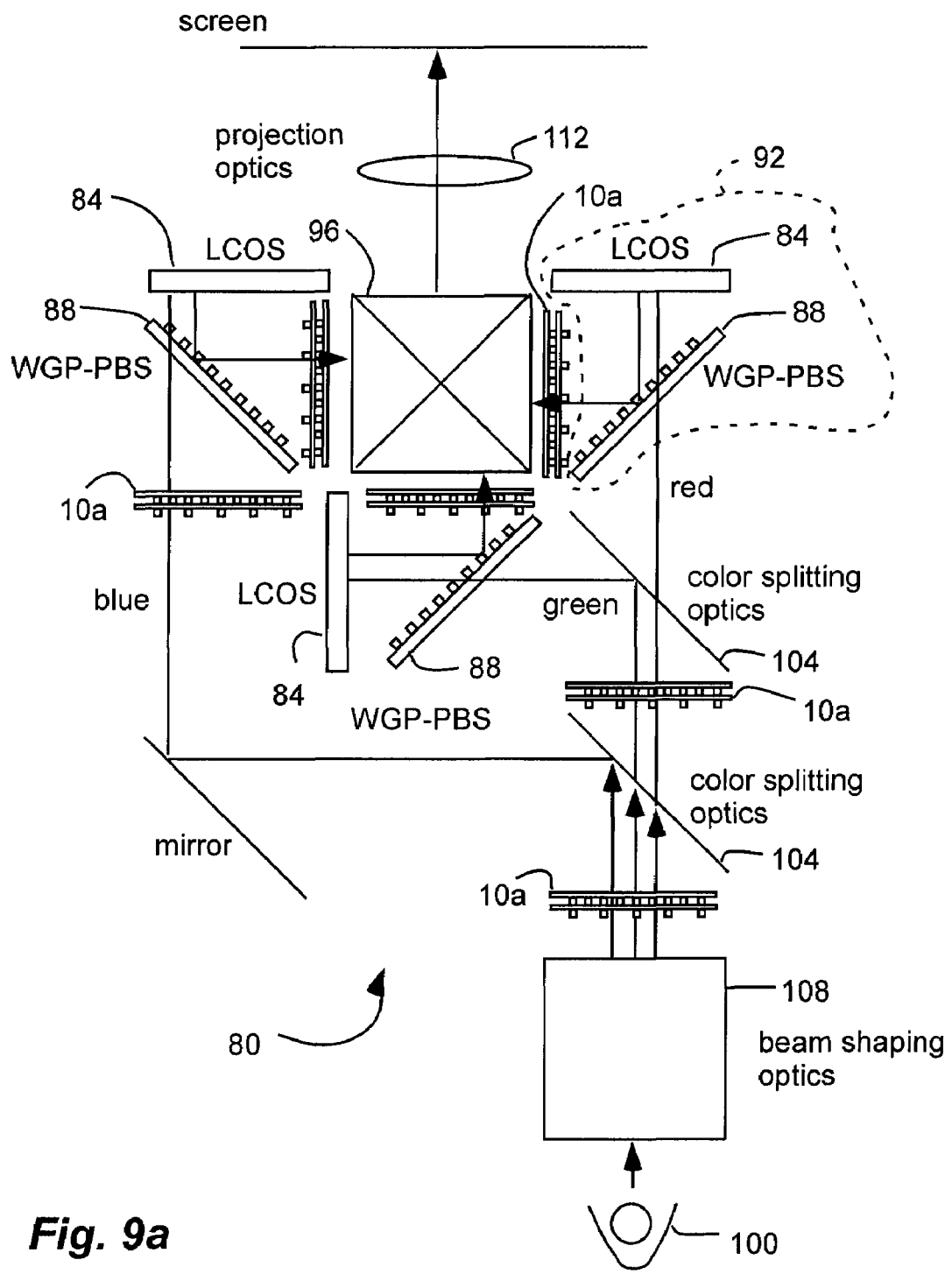
FIGS. 9a and 9b are schematic views of image projection systems with a polarizer device in accordance with an embodiment of the present invention.

As stated above, such a polarizer device (represented by 10a) described above can be utilized in an image or projection display system. Referring to FIG. 9a, an image projection system 80 is shown utilizing the polarizer devices described above (represented by 10a). The image projection system can be a single channel or color system, or can include multiple channels or colors, such as three (red, green and blue) as shown. The system can utilize spatial light modulators 84, such as liquid crystal devices (LCDs), to selectively manipulate light to encode image information thereon. Such LCDs can be reflective or transmissive, and such systems can be designed for transmissive LCDs, or for reflective LCDs, as shown. For example, the system can utilize one or more liquid crystal on silicon (LCOS) panels. An LCD or LCOS panel can be combined or paired with a wire grid polarizing beamsplitter WGP-PBS 88, as originally described in U.S. Pat. No. 6,234,634 (and sometimes referred to as an "image assimilator" 92), to produce an image bearing light beam. In such a pairing, the WGP-PBS acts as both a polarizer for incoming light and an analyzer for light modified by the LCOS panel, resulting in the image bearing light beam. A source light beam (such as a polarized or unpolarized, white or colored light beam) can pass through the WGP-PBS (polarizing or further polarizing the source light beam) and be reflected from the LCD or LCOS panel 84, which selectively rotates the polarization orientation to encode image information thereon. The light with the encoded image information again encounters the WGP-PBS 88 which separates the encoded image information by reflecting one polarization orientation and transmitting the other, resulting in an image beam. Three such LCOS/WGP-PBS pairs can be provided for each color, as shown. A recombination prism 96, recombination optics, x-cube, wire grid polarizers, or the like, can be utilized to combine the three colored light beams. The system can also include a light source 100, color splitting optics 104, beam shaping optics 108, and projection optics 120, as is known in the art.

A polarizer device (represented by 10a) can be utilized as an analyzer, post polarizer, or clean-up polarizer, and disposed between the recombination prism and the LCOS/WGP-PBS pair, or immediately subsequent to the WGP-PBS 88 or image assimilator 92 in the optical path. Thus, the polarizer device 10a can further analyze or clean-up the image beam reflected from the WGP-PBS to further improve contrast, particularly for certain wavelength, such as the blue color channel. In addition, as described above, the polarizer device 10a also substantially diffracts light of the s-polarization orientation, and substantially reduces back reflection of light of the s-polarization of the zero-order, and thus reduces ghost images in the system. In addition, the polarizer device 10a can be oriented orthogonal to the incident light to maintain a compact design. Therefore, the polarizer device 10a can be configured or oriented in a projection system to be orthogonal or normal to the optical path, both efficiently utilizing space and reducing unwanted astigmatism, and reducing back reflection and ghost images.

In addition, a polarizer device (represented by 10a) can be disposed in other locations where a polarizer can be used, such as in the light source, the beam shaping optics, after the beam shaping optics, and/or before the LCOS/WGP-PBS pair as a pre-polarizer. For example, the polarizer device 10a can be disposed prior to the WGP-PBS 88. Again, the polarizer device 10a can both polarize (or further polarize) the incident light and reduce back reflection in the optical path.

Figure 9B:
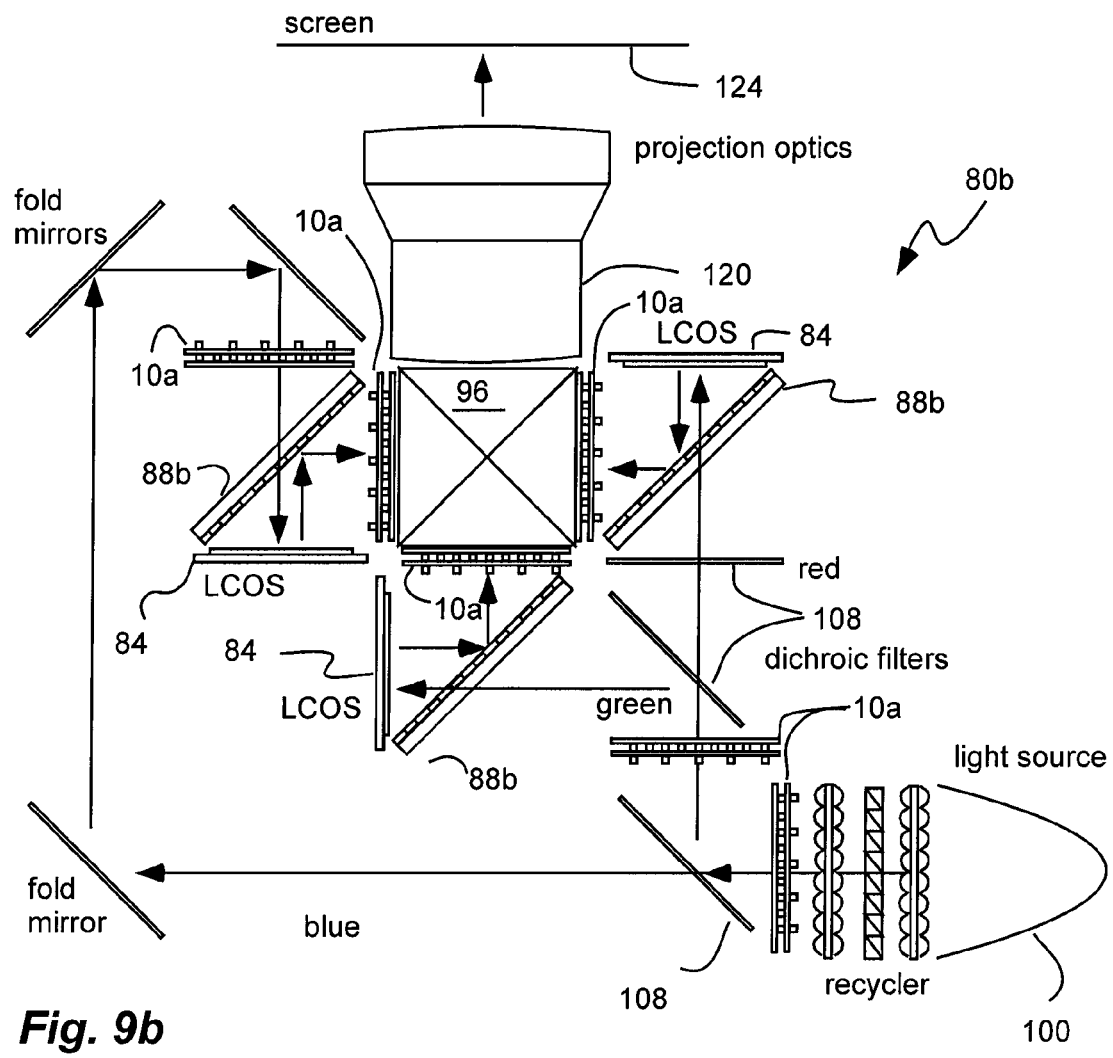

Referring to FIG. 9b, another projection display system 80b is shown utilizing the polarizer devices described above (represented by 10a). The system 80b is similar to the system 80 described above and shown in FIG. 9a. The system 80b includes a light source 100 to produce a light beam. The light beam can be any appropriate type, as known in the art, including an arc light, an LED array, etc. The beam can be treated by various optics, including beam shaping optics, recycling optics, polarizing optics, etc. (Various aspects of using a wire-grid polarizer in light recycling are shown in U.S. Pat. Nos. 6,108,131 and 6,208,463; which are herein incorporated by reference.) In addition, a light recycling system is described below. One or more color separator(s) 108, such as dichroic filters, can be disposable in the light beam to separate the light beam into color light beams, such as red, green and blue.

At least one beam splitter 88b can be disposable in one of the color light beams to transmit a polarized color light beam. The beam splitter 88b can be an inorganic, dielectric grid polarizer, as described in U.S. patent application Ser. No. 11/469,210, filed Aug. 31, 2006. Alternatively, the beam splitter can be a wire-grid polarizer. At least one reflective spatial light modulator 84, such as an LCOS panel, can be disposable in the polarized color light beam to encode image information thereon to produce an image bearing color light beam. The beam splitter 88b can be disposable in the image bearing color light beam to separate the image information and to reflect a polarized image bearing color light beam. As shown, three beam splitters 88b and three spatial light modulators 84 can be used, one for each color of light (blue, green, red). The polarized image bearing color light beams can be combined with an image combiner, such as an X-cube or recombination prism 96. Projection optics 120 can be disposable in the polarized image bearing color light beam to project the image on a screen 124.

A polarizer device (represented by 10a) can be utilized as an analyzer, post polarizer, or clean-up polarizer, as described above. The projection display system 80b can be a three-channel or three-color system which separates and treats three different color beams, such as red, green and blue, as described above. Thus, the system can use at least three polarizer devices 10a. The polarizer devices 10a can be the same and can be configured to operate across the visible spectrum. Alternatively, two or more of the polarizer devices 10a may be tuned to operate with a particular color or wavelength of light. For example, the display system 80b can have two or three different polarizer devices each configured or tuned to operate with one or two colors or wavelengths.

The polarizer devices 10a can face, or can have an image side that faces the incoming direction of the light or beam.

The polarizer device 10a of the present invention reduces heat transfer associated with conductive materials. Thus, it is believed that the polarizer device can be disposed adjacent to, or even abutting to, other components without transferring as much heat to those components. In addition, use of the polarizer device is believed to reduce thermal stress induced birefringence.

Figure 10:
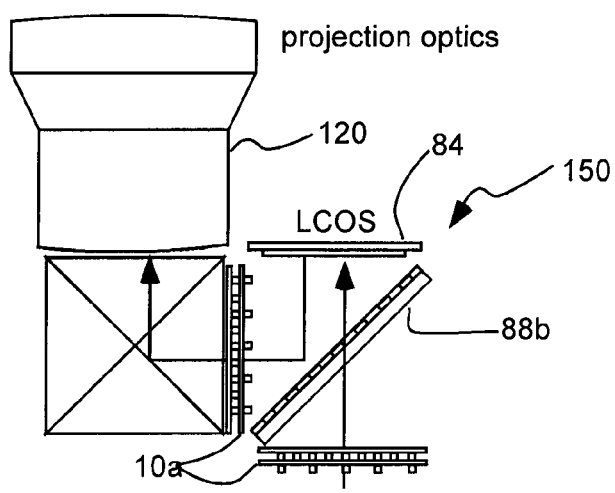
FIG. 10 is a schematic view of an image projection system with a polarizer device in accordance with an embodiment of the present invention.
Figure 11:
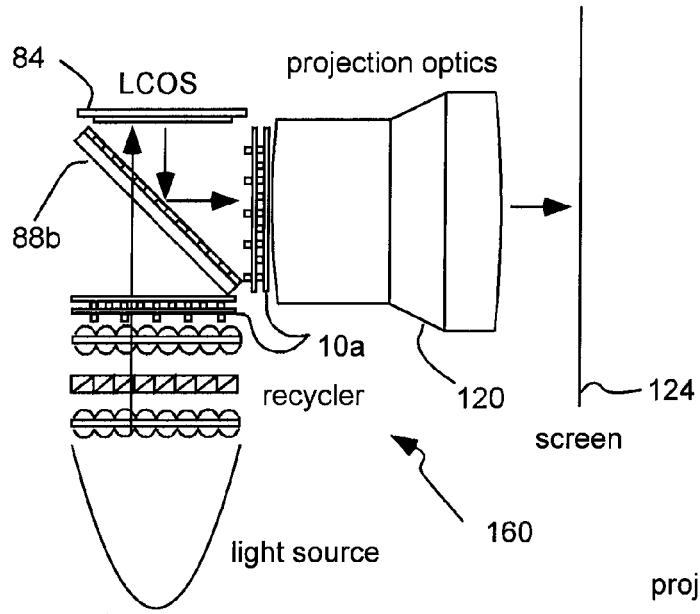
FIG. 11 is a schematic view of an image projection system with a polarizer device in accordance with an embodiment of the present invention.

Referring to FIG. 10, it will be appreciated that the polarizer device 10a described above can be used in a subsystem of the projection display, such as a light engine or a modulation optical system 150, which includes the spatial light modulator 84 and beam splitter 88b. Such a modulation optical system may also include a light source, color separators, beam shaping optics, light recycler, pre-polarizers, post-polarizers, and/or an x-cube. One or more modulation optical systems can be combined with other optics and components in a projection system.

As described above, the reflective spatial light modulator 84 can be configured to selectively encode image information on a polarized incident light beam to encode image information on a reflected beam. The beam splitter 88b can be disposed adjacent the reflective spatial light modulator to provide the polarized incident light beam to the reflective spatial light modulator, and to separate the image information from the reflected beam.

Figure 12:
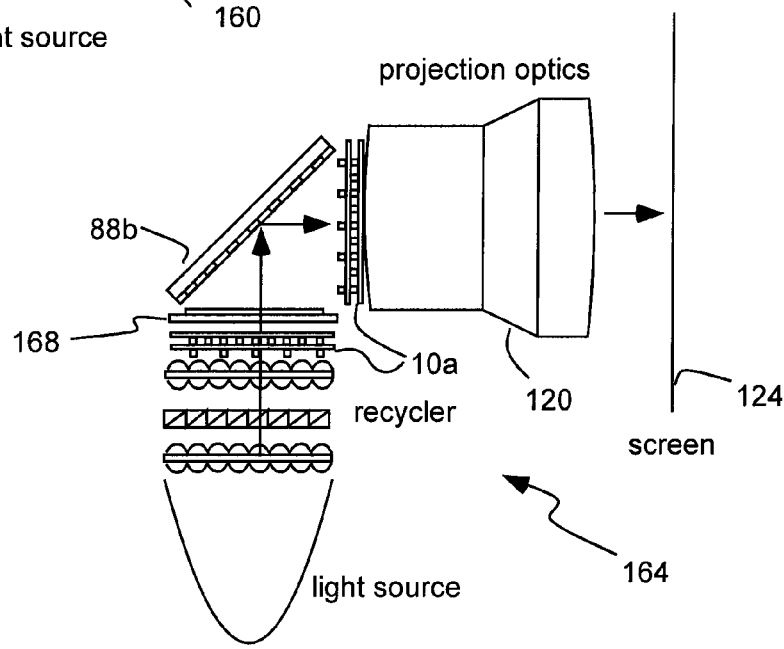
FIG. 12 is a schematic view of an image projection system with a polarizer device in accordance with an embodiment of the present invention.
Figure 13:
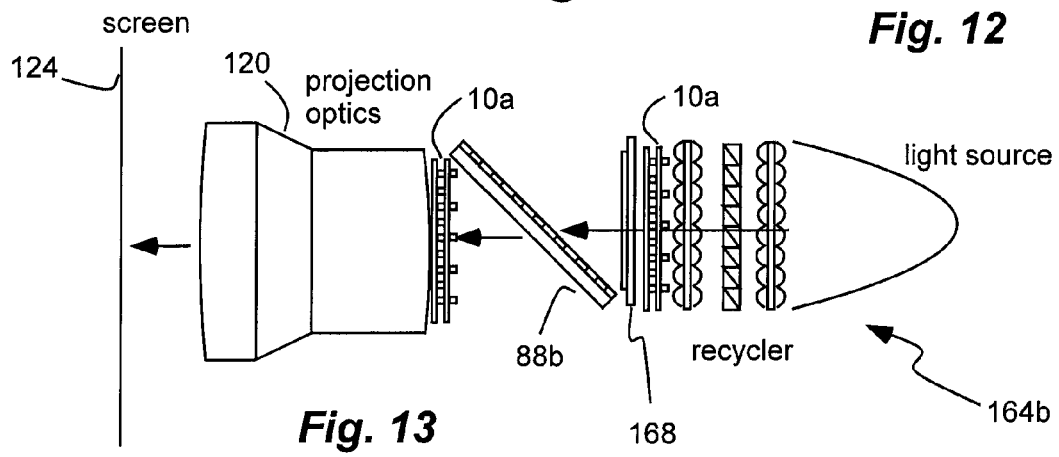
FIG. 13 is a schematic view of an image projection system with a polarizer device in accordance with an embodiment of the present invention.

Although a three-channel, or three-color, projection system has been described above, it will be appreciated that a display system 150, 150b, 160, 164 or 164b can have a single channel, as shown in FIGS. 10-13 and 15. Alternatively, the single channels shown in FIGS. 10-13 and 15 can be modulated so that multiple colors are combined in a single channel. In addition, although the grid polarizer has been described above as being used with a reflective spatial light modulator, such as an LCOS panel (in FIGS. 9a-11, 14 and 15), it will be appreciated that the grid polarizer can be used with a transmissive spatial light modulator 168, as shown in FIGS. 12 and 13. The transmissive spatial light modulator can be a high-temperature polysilicon (HTPS) panel.

Figure 14:
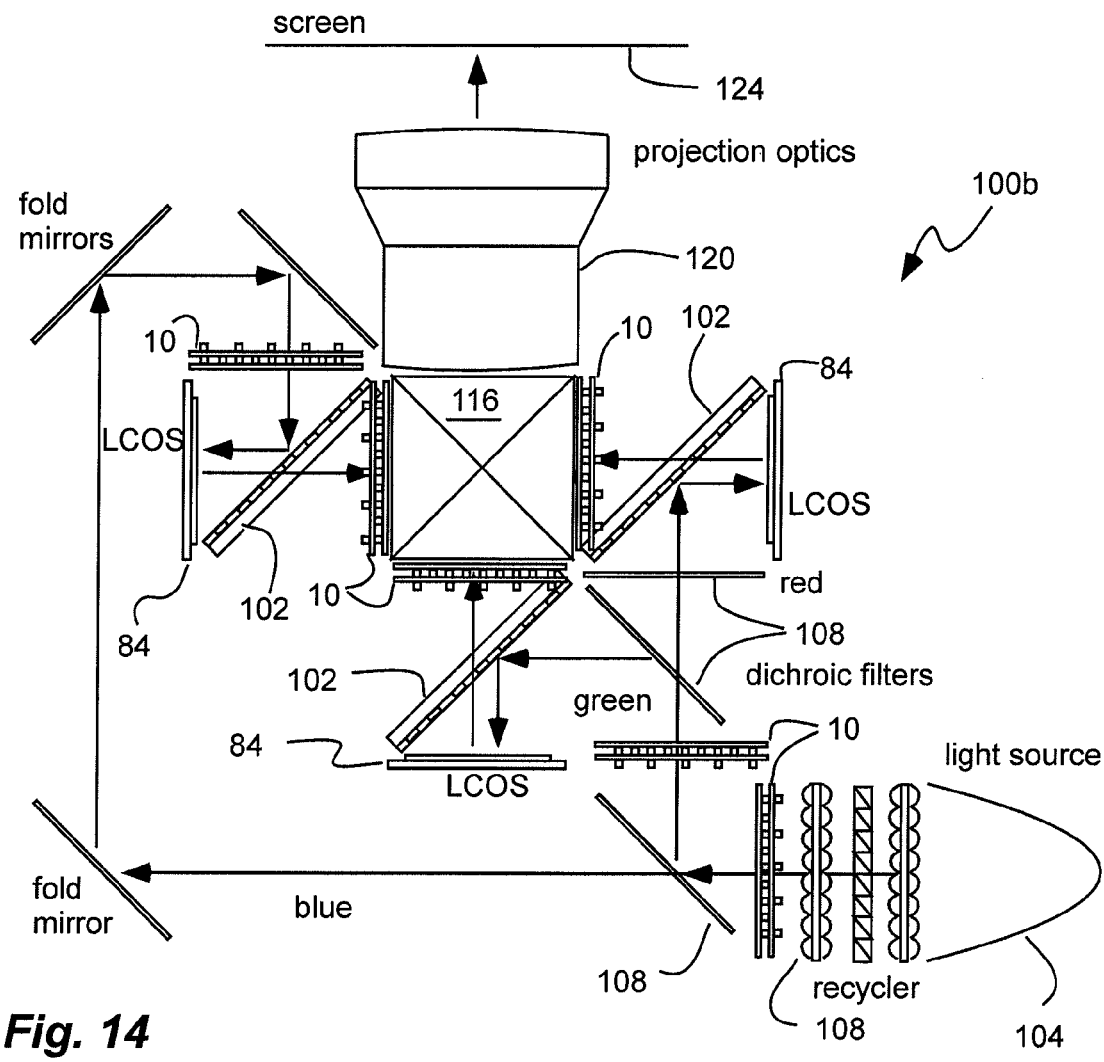
FIG. 14 is a schematic view of an image projection system with a polarizer device in accordance with an embodiment of the present invention.
Figure 15:
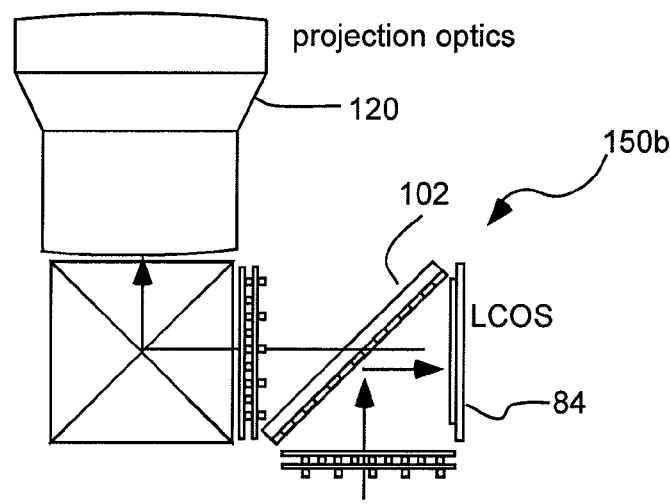
FIG. 15 is a schematic view of an image projection system with a polarizer device in accordance with an embodiment of the present invention.

Although a projection system and modulation optical system were shown in FIGS. 9a-12 with the beam splitter in reflection mode (or with the image reflecting from the beam splitter), it will be appreciated that a projection system 100b or modulation optical system 150b or 164b can be configured with the beam splitter in transmission mode (or with the image transmitting through the beam splitter), as shown in FIGS. 13, 14 and 15.

Referring to FIG. 13, a projection system 164b is shown with a transmissive spatial light modulator 168 and a beam splitter 88b used in transmission mode (or with the image transmitted through the beam splitter).

Various aspects of projection display systems with wire-grid polarizers or wire-grid polarizing beam splitters are shown in U.S. Pat. Nos. 6,234,634; 6,447,120; 6,666,556; 6,585,378; 6,909,473; 6,900,866; 6,982,733; 6,954,245; 6,897,926; 6,805,445; 6,769,779 and U.S. patent application Ser. Nos. 10/812,790; 11/048,675; 11/198,916; 10/902,319; which are herein incorporated by reference.

Although a rear projection system has been described herein it will be appreciated that a projection system can be of any type, including a front projection system.

The above descriptions of the grid polarizer and various applications have been directed to visible light (~400 nm-~700 nm). It will be appreciated, however, that a grid polarizer can be configured for use in infrared light (>~700 nm) and ultra-violet light (<~400 nm) and related applications. Such a grid polarizer can have a larger period and thicker layers.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An inorganic, dielectric grid polarizer device configured to polarize and further control light incident on the device, comprising:

an optical stack with a diffraction grating and an inorganic, dielectric grid polarizer with one disposed over the other;

the inorganic, dielectric grid polarizer including:

a stack of film layers, each film layer being formed of a material that is both inorganic and dielectric;

adjacent film layers having different refractive indices;

at least one of the film layers being discontinuous to form a form birefringent layer with an array of parallel ribs in accordance with $P_{GP}<\lambda/2$ where $P_{GP}$ is the period of the ribs of the grid polarizer and $\lambda$ is the wavelength of the light, to polarize any light incident on the grid polarizer by substantially reflecting the light incident on the grid polarizer with s-polarization orientation and substantially transmitting the light incident on the grid polarizer with p-polarization orientation;

the diffraction grating including an array of elongated parallel dielectric ribs in accordance with $P_{DG} > \lambda/2$ where $P_{DG}$ is the period of the ribs of the diffraction grating, to substantially diffract any light incident on the diffraction grating with the s-polarization orientation of non-zero order at a non-orthogonal angle, so that the diffraction grating and the grid polarizer together substantially pass the light incident on the device having the p-polarization orientation while substantially diffracting light incident on the device having the s-polarization orientation.

2. The device in accordance with claim 1, wherein the ribs of the grid polarizer have a period less than about 210 nm; and wherein the ribs of the diffraction grating have a period greater than 210 nm and less than 700 nm.

3. The device in accordance with claim 1, wherein the period of the diffraction grating is approximately five times greater than the period of the grid polarizer.

4. The device in accordance with claim 1, wherein the ribs of the grid polarizer have a period less than about 400 nm.

5. The device in accordance with claim 1, wherein the diffraction grating is stacked over the grid polarizer with the incident light incident on the diffraction grating; and
wherein the diffraction grating diffracts reflected light with the s-polarization orientation having non-zero order.

6. The device in accordance with claim 1, further comprising:
a continuous layer disposed between the grid polarizer and the diffraction grating, and having a refractive index less than a refractive index of a supporting substrate.

7. The device in accordance with claim 1, further comprising:
at least two continuous layers disposed between the grid polarizer and the diffraction grating, including an upper layer with a refractive index greater than a refractive index of a lower layer.

8. The device in accordance with claim 1, wherein the device substantially transmits light with p-polarization orientation and substantially diffracts light with the s-polarization orientation of non-zero order, without substantially back reflecting light with the s-polarization orientation of zero order.

9. The device in accordance with claim 1, wherein the ribs of the diffraction grating are split into rib pairs of two relatively adjacent ribs that maintain the period between the rib pairs.

10. The device in accordance with claim 1, wherein the film layers alternate between higher and lower refractive indices.

11. The device in accordance with claim 1, wherein the device consists of only inorganic and dielectric materials.

12. The device in accordance with claim 1, wherein the device is formed without any organic or electrically conductive material.

13. The device in accordance with claim 1, wherein all of the film layers are discontinuous and form the array of parallel ribs of the grid polarizer.

14. An inorganic, dielectric grid polarizer device configured to polarize and further control light incident on the device, comprising:
an optical stack with a diffraction grating and an inorganic, dielectric grid polarizer with one disposed over the other;
the inorganic, dielectric grid polarizer including:
a stack of film layers,
each film layer being formed of a material that is both inorganic and dielectric;
adjacent film layers having different refractive indices;
at least one of the film layers being discontinuous to form a form birefringent layer with an array of parallel ribs in accordance with $P_{GP} < \lambda/2$ where $P_{GP}$ is the period of the ribs of the grid polarizer and $\lambda$ is the wavelength of the light, to polarize any light incident on the grid polarizer by substantially reflecting the light incident on the grid polarizer with s-polarization orientation and substantially transmitting the light incident on the grid polarizer with p-polarization orientation;
the diffraction grating including an array of elongated parallel dielectric ribs in accordance with $P_{DG} > \lambda/2$ where $P_{DG}$ is the period of the ribs of the diffraction grating, to substantially diffract any light incident on the diffraction grating with the s-polarization orientation of non-zero order at a non-orthogonal angle, so that the diffraction grating and the grid polarizer together substantially pass the light incident on the device having the p-polarization orientation while substantially diffracting the light incident on the device having s-polarization orientation; and
the ribs of the diffraction grating being split into rib pairs of two relatively adjacent ribs that maintain the period between the rib pairs.

15. The device in accordance with claim 14, wherein the ribs of the grid polarizer have a period less than about 210 nm; and wherein the ribs of the diffraction grating have a period greater than 210 nm and less than 700 nm.

16. The device in accordance with claim 14, wherein the period of the diffraction grating is approximately five times greater than the period of the grid polarizer.

17. The device in accordance with claim 14, wherein the ribs of the grid polarizer have a period less than about 400 nm.

18. The device in accordance with claim 14, wherein the diffraction grating is stacked over the grid polarizer with the incident light incident on the diffraction grating; and
wherein the diffraction grating diffracts reflected light with the s-polarization orientation having non-zero order.

19. The device in accordance with claim 14, further comprising:
a continuous layer disposed between the grid polarizer and the diffraction grating, and having a refractive index less than a refractive index of a supporting substrate.

20. The device in accordance with claim 14, further comprising:
at least two continuous layers disposed between the grid polarizer and the diffraction grating, including an upper layer with a refractive index greater than a refractive index of a lower layer.

* * * * *